United States Patent
Kauppinen et al.

(10) Patent No.: US 8,362,738 B2
(45) Date of Patent: Jan. 29, 2013

(54) DETERMINATION OF THE POSITION OF THE ROTOR OF AN ELECTRIC MACHINE

(75) Inventors: Tuukka Kauppinen, Hyvinkää (FI); Lauri Stolt, Helsinki (FI)

(73) Assignee: Kone Corporation, Helsinki (FI)

( * ) Notice: Subject to any disclaimer, the term of this patent is extended or adjusted under 35 U.S.C. 154(b) by 130 days.

(21) Appl. No.: 12/897,506

(22) Filed: Oct. 4, 2010

(65) Prior Publication Data

US 2011/0037421 A1 Feb. 17, 2011

Related U.S. Application Data

(63) Continuation of application No. PCT/FI2009/000043, filed on Apr. 1, 2009.

(30) Foreign Application Priority Data

Apr. 24, 2008 (FI) ...................................... 20080318

(51) Int. Cl.
*H02P 27/04* (2006.01)
*H02P 3/00* (2006.01)
*H02P 1/04* (2006.01)
*H02P 6/18* (2006.01)

(52) U.S. Cl. ................... 318/800; 318/372; 318/400.33; 318/400.34

(58) Field of Classification Search .................. 318/372, 318/400.33, 400.34, 800
See application file for complete search history.

(56) References Cited

U.S. PATENT DOCUMENTS

| | | | |
|---|---|---|---|
| 4,186,344 A * | 1/1980 | Higuchi et al. ................. 455/86 |
| 5,053,689 A * | 10/1991 | Woodson et al. ............. 318/705 |
| 5,608,300 A * | 3/1997 | Kawabata et al. ............ 318/721 |
| 5,729,113 A | 3/1998 | Jansen et al. |
| 6,401,875 B1 | 6/2002 | Marvin et al. |
| 6,756,763 B2 * | 6/2004 | Kahlon et al. ................. 318/727 |
| 6,856,061 B2 * | 2/2005 | Nishizawa et al. ........... 310/162 |
| 2005/0140320 A1 * | 6/2005 | Hidaka ......................... 318/379 |
| 2008/0169732 A1 * | 7/2008 | Chang ......................... 310/67 R |

OTHER PUBLICATIONS

Schmidt et al., "Initial Rotor Angle Detection of A Non-Salient Pole Permanent Magnet Synchronous Machine," IEEE Industry Applications Society, Annual Meeting, New Orleans, Louisiana, Oct. 5-9, 1997 (5 Pages).

* cited by examiner

*Primary Examiner* — Walter Benson
*Assistant Examiner* — Gabriel Agared
(74) *Attorney, Agent, or Firm* — Birch, Stewart, Kolasch & Birch, LLP

(57) ABSTRACT

A frequency converter and a method for determining the position of the rotor of an electric machine are provided. The frequency converter includes a load bridge and a control of the load bridge, for supplying electricity between the load bridge and an electric machine connected to the load bridge. The frequency converter includes a determination for at least one electrical parameter of the electric machine, and includes a determination for the position of the rotor of the electric machine. The load bridge is fitted to supply a first alternating electricity excitation signal, which is formed in relation to the electrical angle of the electric machine, to the electric machine. The frequency converter is further fitted to determine the first alternating electricity response signal corresponding to the first alternating electricity excitation signal, and the position of the rotor is determined on the basis of the first alternating electricity response signal.

16 Claims, 4 Drawing Sheets

Figure 1:
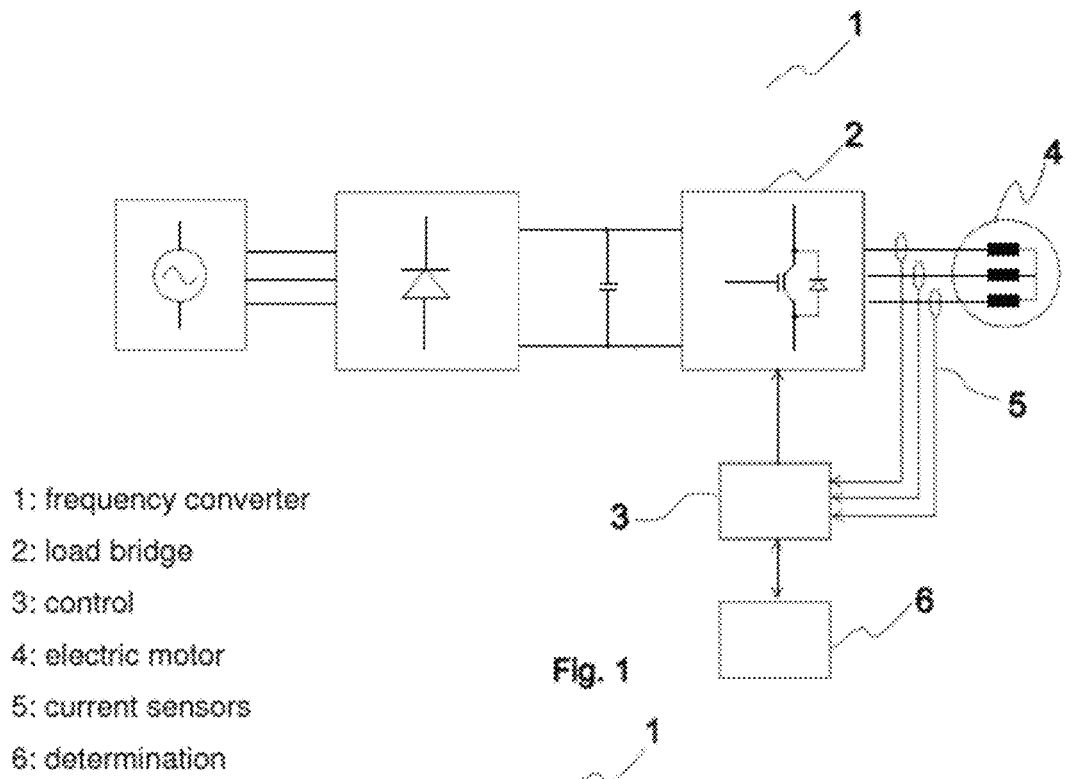

1: frequency converter
2: load bridge
3: control
4: electric motor
5: current sensors
6: determination 1: frequency converter
2: load bridge
3: control
4: electric motor
6: determination 2: load bridge
3: control
4: electric motor
5: current sensors
22: conversion block
23: rotation indicator 28: reference point
29: rotor magnet
30: direction of magnetization

DETERMINATION OF THE POSITION OF THE ROTOR OF AN ELECTRIC MACHINE

This application is a Continuation of copending PCT International Application No. PCT/FI2009/000043 filed on Apr. 1, 2009, which claims the benefit of Patent Application No. 20080318 filed in Finland on Apr. 24, 2008. The entire content of each of the above documents is hereby incorporated by reference into the present application.

The object of the invention is a frequency converter an electric drive, and a method for determining the position of the rotor of an electric machine.

In the regulation of an electric machine, the position of the rotor is conventionally identified with an absolute encoder, such as a resolver. Recently, different sensorless identifications of the position have also been developed, which are based on e.g. measurement of the inductance of the magnetic circuit of the electric machine as well as on estimation of the source voltage of the motor.

Of the control methods of an electric machine, e.g. vector regulation methods generally require identification of the starting position of the rotor, especially in synchronous machine drives. A position error occurring at the start of the run and at low speeds might result in uncontrolled behavior of the motor and thus to a hazardous situation.

Methods are known to prior art in which the starting position between the rotor and the stator is synchronized by supplying direct current to the stator winding and by releasing the magnetized rotor to freely move, in which case the rotor endeavors to turn according to the stator magnetization. In this case a problem is the initial swing of the rotor, which depending on the application may cause deterioration of drive comfort or can even be actually dangerous.

Methods have also been developed in which the starting position of the rotor is determined by measuring the variation of the inductance of the magnetic circuit of the electric machine. This type of method is presented e.g. in the publication "Peter B. Schmidt, Michael L. Gasperi, Glen Ray, Ajith H. Wijenayake: Initial Rotor Angle Detection Of A Non-Salient Pole Permanent Magnet Synchronous Machine" IEEE Industry Application Society, Annual Meeting, New Orleans, La., Oct. 5-9, 1997. The publication referred to presents an identification of the position of the rotor of a permanent-magnet motor, wherein a pulse-like voltage signal with the determined values of the electrical angle of the motor is supplied to the stator winding of the permanent-magnet motor as an excitation, and the current response signals produced by the supplied pulse-like voltage signals are measured. The inductance of the electric machine can in this case be determined from the current responses. When the measurement is repeated with sufficiently many different values of electrical angle, the variation of the inductance can be determined. Since the variation of the inductance is based on, among other things, saturation phenomena of the magnetic circuit cause by the rotor magnetization, thus also the position between the rotor and the stator can be determined.

A problem with the aforementioned determination of the rotor position is that the pulse-like voltage signals and their current response signals produce a loud disturbing noise in the electric machine. The use of an electric machine controlled in this way e.g. in residential buildings can, in fact, be disturbing, and may require sound insulation of the electric machine. Problems may occur e.g. in elevator systems in which the hoisting machine is controlled with the aforementioned method. More particularly a problem may occur in elevator systems without machine rooms, in which the hoisting machine is disposed in the elevator hoistway of the building. In addition, a problem in the aforementioned determination of the position of the rotor is the measurement of the inductance must be performed by supplying a pulse-like voltage signal separately with many different values of the electrical angle to achieve sufficient accuracy, which lengthens the measuring and at the same time the duration of the noise caused by the measuring is lengthened.

Publication U.S. Pat. No. 6,401,875 B1 presents an identification of the position of the rotor of a permanent-magnet motor, wherein a current signal is supplied to the stator winding of the permanent-magnet motor separately with a number of different values of the electrical angle, and the supply voltage signals corresponding to the supplied current signals are measured. In this case the inductance of the electric machine can be determined from the supply voltage signals. When the measurement is repeated with sufficiently many different values of electrical angle, the variation of the inductance can be determined. Since the variation of the inductance is based on, among other things, saturation phenomena of the magnetic circuit cause by the rotor magnetization, thus also the position between the rotor and the stator can be determined.

The purpose of this invention is to solve the problems presented above in the description of prior art as well as the problems disclosed in the description of the invention below. In this case a determination of the position of the rotor of an electric machine that is quieter and faster than prior art is disclosed. By means of the determination of the position of the rotor of an electric machine according to the invention it is possible to determine e.g. the angle of impulsion of the rotor for controlling the electric machine.

Some inventive embodiments are also discussed in the descriptive section of the present application. The inventive content of the application can also be defined differently than in the claims presented below. The inventive content may also consist of several separate inventions, especially if the invention is considered in the light of expressions or implicit subtasks or from the point of view of advantages or categories of advantages achieved. In this case, some of the attributes contained in the claims below may be superfluous from the point of view of separate inventive concepts.

The frequency converter according to the invention can be e.g. a frequency converter with a current intermediate circuit, a frequency converter with a voltage intermediate circuit and a matrix converter.

The electric machine according to the invention can be e.g. an electric motor or a generator. In this case the electric machine can be e.g. a synchronous machine with a rotor winding or magnetized with permanent magnets, or a direct-current machine without brushes. The electric machine can also be e.g. a step motor or a reluctance motor. The electric machine can be rotating or it can also be fitted to operate on the linear motor principle.

In one embodiment of the invention the motor drive is fitted to move the transport appliance of a transport system. This type of transport system can be e.g. an elevator system, an escalator system, a travelator system, a direct drive elevator system, a crane system or a vehicle system. If a motor drive is fitted to the elevator system, the electric machine can also comprise a traction sheave connected to the hoisting rope or hoisting belt of the elevator. The electric machine can in this case be either with a gear or without a gear.

The electrical angle of the electric machine refers to the angle value determined by the cycle length of the magnetic flux rotating in the electric machine. In one embodiment of the invention the cycle length of the magnetic flux corresponds here to an electrical angle of 360 degrees in the electric machine.

In the invention alternating electricity excitation signal refers to an alternating electricity signal, essentially continuous in terms of its fundamental wave, that is formed in relation to the electrical angle of the electric machine and that changes according to the electrical angle. This type of alternating electricity excitation signal is e.g. an essentially sinusoidal voltage signal or current signal determined as a function of the electrical angle of the motor. The alternating electricity excitation signal thus changes only when the value of the electrical angle changes; if the value of the electrical angle remains constant, the value of the alternating electricity excitation signal also remains unchanged.

In the invention, pulse-like electrical excitation signal refers to a signal that is formed in a pulse-like way essentially with some constant value of the electrical angle of the electric machine.

In the invention, an electrical parameter of the electric machine refers to e.g. the current, voltage and output power of the electric machine.

The frequency converter according to the invention comprises a load bridge and also a control of the load bridge, for supplying electricity between the load bridge and an electric machine connected to the load bridge. The frequency converter also comprises a determination for at least one electrical parameter of the aforementioned electric machine, and also a determination for the position of the rotor of the aforementioned electric machine. The load bridge is fitted to supply a first alternating electricity excitation signal to the aforementioned electric machine, which first alternating electricity excitation signal is formed in relation to the electrical angle of the electric machine. The frequency converter is fitted to determine the first alternating electricity response signal corresponding to the aforementioned first alternating electricity excitation signal, and the position of the rotor is determined on the basis of the first alternating electricity response signal.

In one embodiment of the invention the alternating electricity excitation signal is made to change according to the electrical angle, and the angle of impulsion of the rotor is determined on the basis of the first alternating electricity response signal.

The electrical drive according to the invention comprises an electric machine and also a frequency converter connected to the electric machine. The electric machine comprises a machinery brake for preventing movement of the rotor, and the electrical drive comprises a control of the machinery brake. The frequency converter comprises a load bridge and also a control of the load bridge, for supplying electricity between the load bridge and an electric machine connected to the load bridge. The frequency converter comprises a determination for at least one electrical parameter of the aforementioned electric machine. The frequency converter also comprises a determination for the position of the rotor of the aforementioned electric machine. The machinery brake of the aforementioned electric machine is during the determination of the position of the rotor controlled to prevent movement of the rotor, and the load bridge is fitted to supply a first alternating electricity excitation signal to the aforementioned electric machine, which first alternating electricity excitation signal is formed in relation to the electrical angle of the electric machine. The frequency converter is fitted to determine the first alternating electricity response signal corresponding to the aforementioned first alternating electricity excitation signal, and the position of the rotor is determined on the basis of the first alternating electricity response signal.

In the method according to the invention for determining the position of the rotor of an electric machine a first alternating electricity excitation signal is formed in relation to the electrical angle of the electric machine; the first alternating electricity excitation signal is supplied to the electric machine; a first alternating electricity response signal corresponding to the first alternating electricity excitation signal is determined; and also the position of the rotor is determined on the basis of the first alternating electricity response signal.

In one embodiment of the invention the determination of an electrical parameter of the electric machine comprises a current sensor. The current sensor can be e.g. a current transformer, a Hall sensor, a magneto-resistive sensor or a measuring resistor.

In one embodiment of the invention the determination of an electrical parameter of the electric machine comprises a voltage sensor. The voltage sensor can be e.g. a measuring transformer, a linear opto-isolator or a measuring resistor.

In one embodiment of the invention an alternating voltage signal is fitted to be the alternating electricity excitation signal and an alternating current signal is fitted to be the alternating electricity response signal.

In a second embodiment of the invention an alternating current signal is fitted to be the alternating electricity excitation signal and an alternating voltage signal is fitted to be the alternating electricity response signal.

When the position of the rotor of the electric machine is determined on the basis of the first alternating electricity response signal, the noise of the electric machine caused by the determination is quieter than prior art, because as presented in the invention the first alternating electricity excitation signal, which is essentially constant in terms of its fundamental wave, does not produce the same type of disturbing noise in the electric machine as e.g. those prior-art methods in which pulse-like current signals or voltage signals are supplied to the electric machine as excitation signals. Since, as presented in the invention, the first alternating electricity excitation signal is formed in relation to the electrical angle of the electric machine, it is possible to measure the inductance of the magnetic circuit at all the electrical angle intervals of the electric machine with the first alternating electricity excitation signal, nor does the measurement need to be repeated with many separate determined values of the electrical angle of the electric machine, which speeds up the measuring.

When a first and a second alternating electricity excitation signal are supplied to the electric machine, which first and second alternating electricity excitation signal are fitted to be of opposite directions in their rotation directions, the phase shift between the alternating electricity excitation signal and the corresponding alternating electricity response signal that causes a measuring error can be compensated, because the sign digit of the aforementioned phase shift changes as the rotation direction of the alternating electricity excitation signal changes. In this case the phase shift between the first alternating electricity excitation signal and the first alternating electricity response signal is of the opposite direction with respect to the phase shift between the second alternating electricity excitation signal and the second alternating electricity response signal, and the aforementioned phase shifts of opposite directions can be compensated between each other.

When the angle of impulsion of the rotor of the electric machine is determined according to the invention, an absolute sensor can be used for the regulation of the electric machine instead of an incremental sensor. The incremental sensor does not in this case necessarily need to be fitted directly to the shaft of the electric machine, but instead it can be fitted e.g. via frictive traction to a rotating part of the electric machine, such as for instance in connection with the traction sheave of the hoisting machine of the elevator, which simplifies the fitting of the sensor. In this case e.g. an encoder can also be used as a sensor instead of an absolute sensor, which is generally a more cost-effective solution than an absolute sensor.

Figure 2:
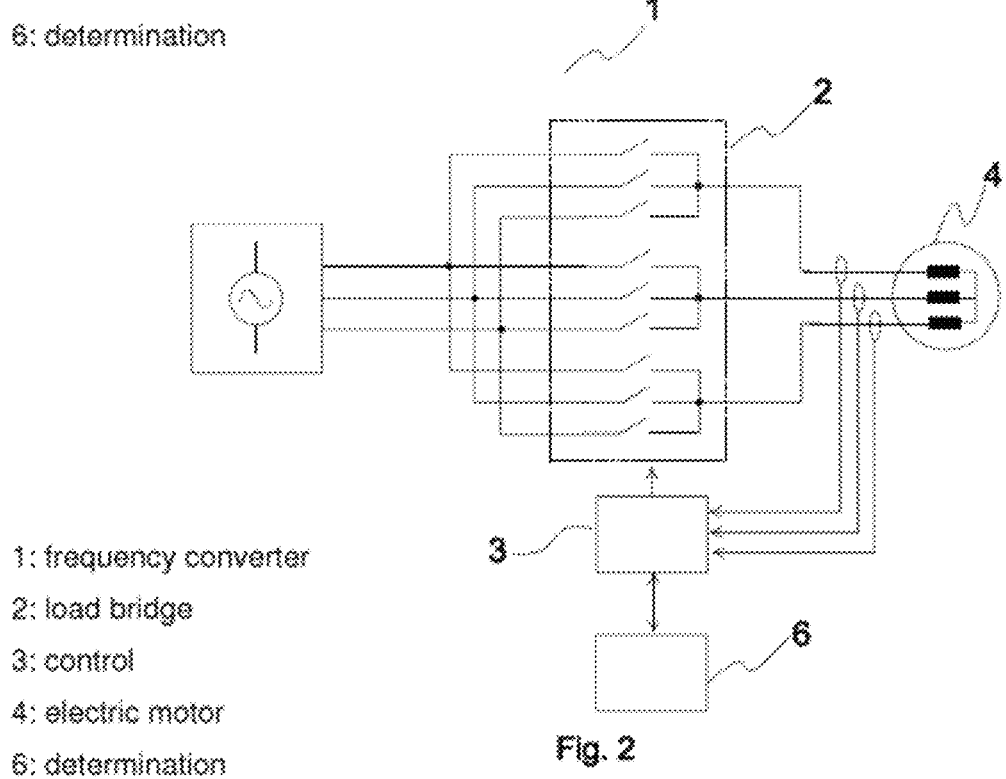
Figure 3:
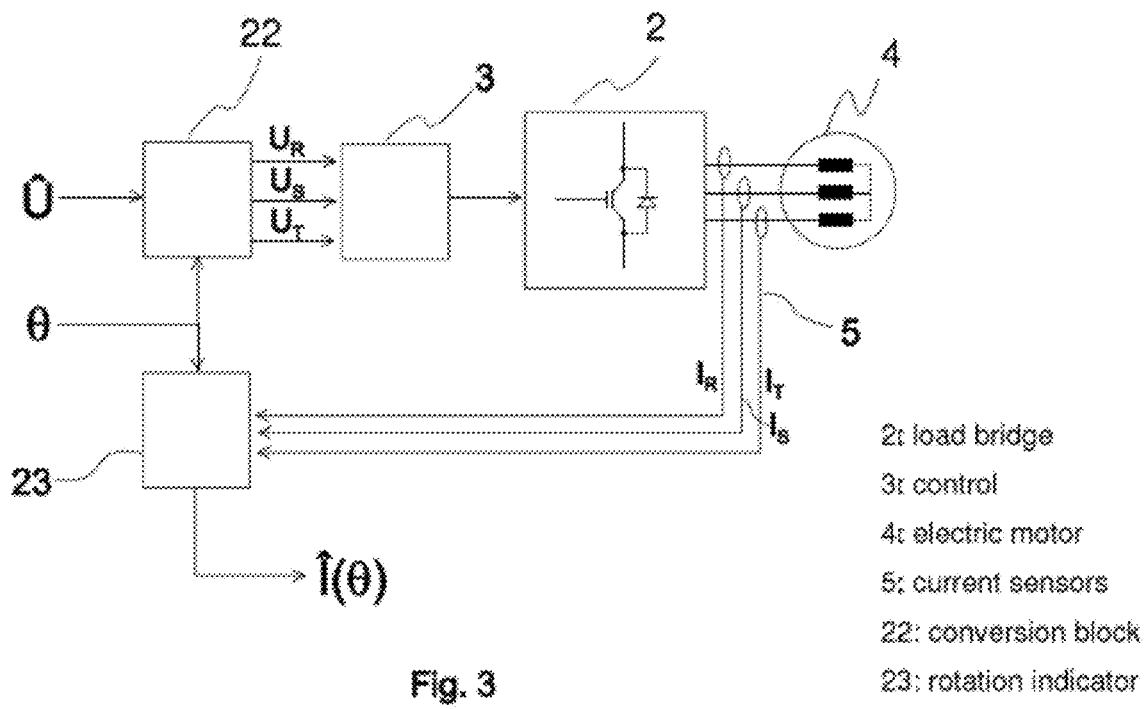
Figure 4:
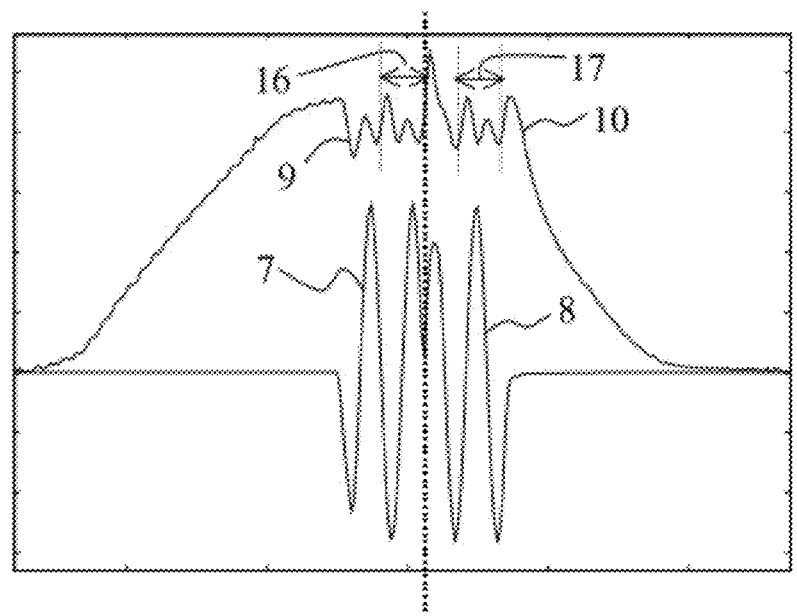
Figure 5:
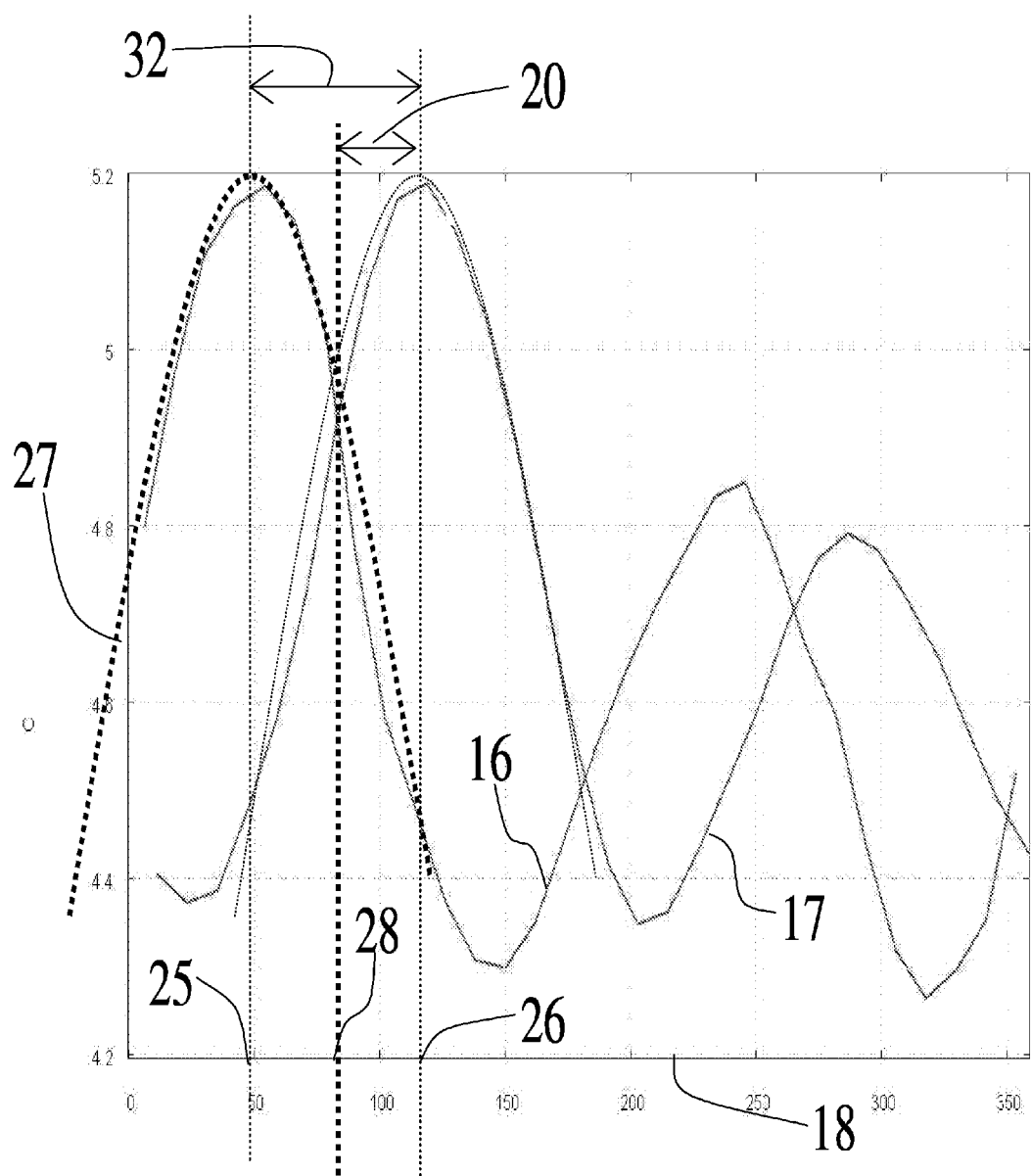
Figure 6:
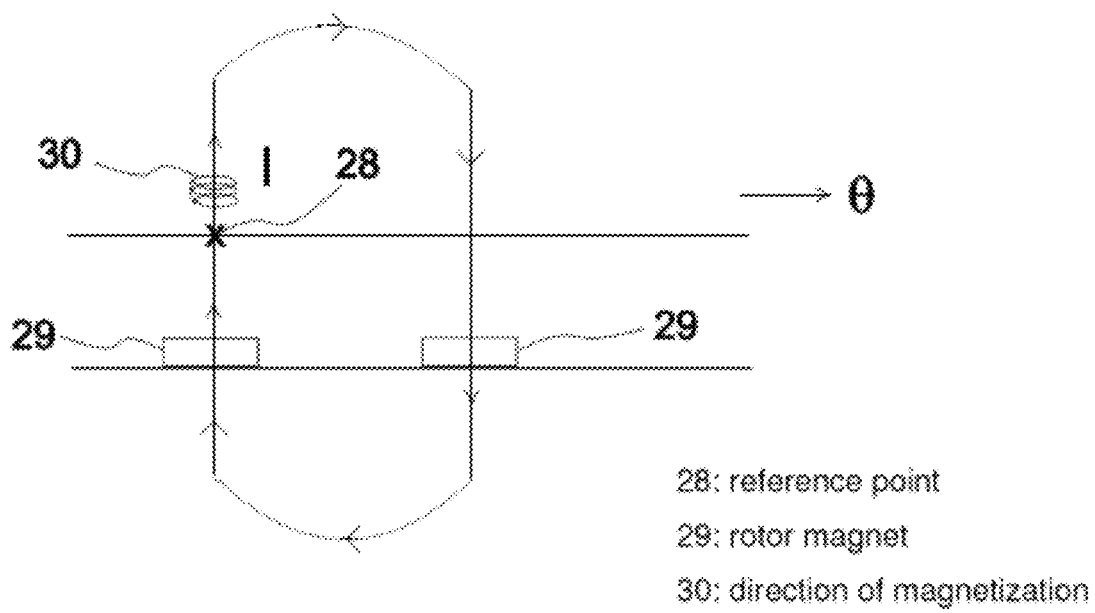
Figure 7:
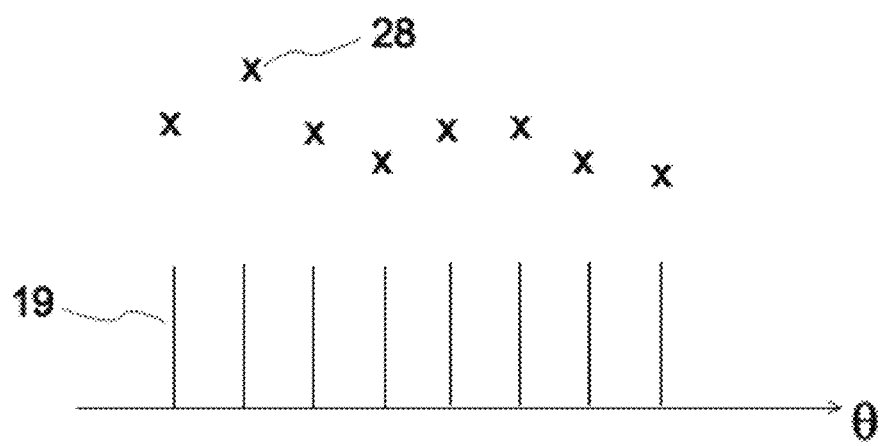

In the following, the invention will be described in more detail by the aid of a few examples of its embodiments with reference to the attached drawings, wherein FIG. 1 presents a frequency converter with a voltage intermediate circuit according to the invention FIG. 2 presents a second frequency converter according to the invention FIG. 3 presents a determination of the position of the rotor of an electric machine according to the invention FIG. 4 presents the electrical parameters of the electric machine during one determination of the position of the rotor according to the invention FIG. 5 presents the amplitude of the alternating current response signal according to the invention as a function of the electrical angle of the electric machine FIG. 6 presents the magnetic circuit of an electric machine according to the invention FIG. 7 presents a determination of the position of the rotor according to prior art FIG. 1 presents a frequency converter 1 with a voltage intermediate circuit according to the invention. The frequency converter is fitted to supply power between the electricity network and the electric motor 4. In this embodiment of the invention the electric motor 4 is a permanently magnetized synchronous motor. The frequency converter comprises a load bridge 2, which is connected to the electric motor 4 for supplying power between the electric motor and the load bridge. The load bridge 2 comprises controllable solid-state switches. The supply voltage of the electric motor 4 is formed by controlling the solid-state switches of the load bridge 2 with the control 3 of the load bridge with pulse-width modulation. The frequency converter comprises current sensors 5, which are fitted in connection with the supply cables of the stator winding for measuring the stator current. A determination 6 for the position of the rotor of the electric motor is also fitted in connection with the control 3 of the load bridge.

The load bridge 2 is fitted to supply a first alternating voltage excitation signal 7 to the electric motor 4. The alternating voltage excitation signal is formed in relation to the electrical angle 18 of the electric machine. The amplitude of the alternating voltage excitation signal is essentially constant, and the excitation signal changes as a function of the aforementioned electrical angle 18. The current of the stator winding of the electric motor produced by the supplied alternating voltage excitation signal 7 is measured with the current sensors 5. The measured current forms a first alternating current response signal 9,16 corresponding to the supplied first alternating voltage excitation signal 7, and the position of the rotor of the electric motor is determined on the basis of the determined aforementioned first alternating current response signal 9,16.

FIG. 2 presents a second frequency converter 1 according to the invention. In this embodiment of the invention the load bridge 2 of the frequency converter is implemented as a matrix converter. The supply voltage of the electric motor 4 is in this case formed by controlling the solid-state switches of the load bridge 2 with the control 3 of the load bridge such that the phase of the electric motor 4 is transiently connected to the determined phase of the electricity network for achieving the intended supply voltage of the electric motor 4.

The load bridge 2 is fitted to supply a first alternating voltage excitation signal 7 to the electric motor 4 according to the embodiment of FIG. 1. The current of the stator winding of the electric motor produced by the supplied alternating voltage excitation signal 7 is also measured as in the embodiment of FIG. 1. The measured current forms a first alternating current response signal 9,16 corresponding to the supplied first alternating voltage excitation signal 7 and the position of the rotor of the electric motor is determined on the basis of the determined aforementioned first alternating current response signal 9,16.

The controllable solid-state switches of the load bridge 2 referred to in the invention can be e.g. IGBT transistors, MOSFET transistors or thyristors.

FIG. 3 presents as a block diagram one determination 6 of the position of the rotor of an electric machine according to the invention. Movement of the rotor of the electric machine 4 is prevented during the determination of the position of the rotor. The conversion block 22 forms the three-phase supply voltage reference $U_R$, $U_S$, $U_T$ of the electric machine from the amplitude reference $\hat{U}$ as well as from the electrical angle reference $\theta$ of the electric machine, in which case the three-phase supply voltage reference is formed as a function of the electrical angle reference $\theta$. The supply voltage reference $U_R$ of the R-phase is in this case of the form: $\hat{U} \sin \theta$. The control 3 of the load bridge controls the solid-state switches of the load bridge 2 according to the aforementioned three-phase supply voltage reference $U_R$, $U_S$, $U_T$ for forming the first three-phase alternating voltage excitation signal 7 for the electric machine. In this embodiment of the invention the value of the electrical angle reference $\theta$ is changed evenly, in which case the rotation speed of the supply voltage reference and at the same time of the alternating voltage excitation signal 7,8 is constant. The first three-phase alternating current response signal $I_R$, $I_S$, $I_T$ produced in the winding of the electric machine by the first three-phase alternating voltage excitation signal is measured 5 as a function of the electrical angle reference $\theta$ of the electric machine. The amplitude of the measured first three-phase alternating current response signal 9,16 is determined 23 with some prior-art method, e.g. by forming a rotation indicator of the current vector for the three-phase alternating current response signal. The variation of the inductance of the magnetic circuit of the electric machine causes the amplitude $\hat{I}$ of also the measured first alternating current response signal 9,16 to vary as a function $\hat{I}(\theta)$ of the electrical angle reference $\theta$. The impedance of the magnetic circuit also causes a phase difference to form between the supplied first alternating voltage excitation signal 7 and the measured first alternating current response signal 9,16. To compensate for the phase difference, the measurement described above is repeated by supplying a second alternating voltage excitation signal 8 as a function of the electrical angle reference $\theta$. The rotation direction of the second alternating voltage excitation signal 8 is selected to be the opposite to the rotation direction of the first alternating voltage excitation signal 7, in which case the phase difference between the first alternating voltage excitation signal 7 and the first alternating current response signal 9,16 forms to be in the opposite direction compared to the phase difference between the second alternating voltage excitation signal 8 and the second alternating current response signal 10, 17. FIG. 4 presents the first alternating voltage excitation signal 7 of the R-phase and also the second alternating voltage excitation signal 8 of the R-phase, which are formed consecutively. The amplitude of the alternating voltage excitation signals is otherwise constant, but the second alternating voltage excitation signal 8 is reduced at the start. This is because the change in the rotation direction of the alternating voltage excitation signal causes a change phenomenon that affects the current of the winding of the electric machine, which is endeavored to be compensated for by transiently decreasing the amplitude of the voltage of the alternating voltage excitation signal 8. FIG. 4 also presents the amplitude of the first alternating current response signal 9 corresponding to the first alternating voltage excitation signal 7 as a function Î(θ) of the electrical angle, and likewise the amplitude of the second alternating current response signal 10 corresponding to the second alternating voltage excitation signal 8 as a function of the electrical angle. FIG. 5 presents in more detail the amplitudes of the first 16 and the second 17 alternating current response signals for the cycle length of 0 . . . 360 degrees of electrical angle of the electrical angle reference θ of the electric machine. The variation in the amplitudes as a function of the electrical angle reference θ 18 results from the inductance of the magnetic circuit of the electric machine varying owing to, among other things, local saturation of the magnetic circuit. Here, local saturation refers to the type of saturation phenomenon of a magnetic circuit, which varies in relation to the electrical angle of the electric machine. This kind of local saturation is caused by, among other things, the permanent magnets of the rotor, in which case the position of the permanent magnets of the rotor can be determined utilizing the local saturation. On the other hand, a variation of the geometry of the magnetic circuit, such as e.g. a variation in the length of the air gap of the electric machine, can also cause a local variation of the inductance of the magnetic circuit of the electric machine. This type of variation in the length of the air gap occurs e.g. in salient pole electric machines. The local variation of the inductance of the magnetic circuit of the electric machine caused by a variation of the geometry of the magnetic circuit of an electric machine of the aforementioned type can also be used for the determination of the position of the rotor according to the invention. In this case the angle of impulsion of the rotor, i.e. the position of the magnetic poles of the rotor, can thus be determined in a situation where the rotor is locked into its position.

From FIG. 5 it is also possible to detect the phase difference 32 between the graphs Î(θ) of the amplitudes of the first alternating current response signal 16 and the second alternating current response signal 17, which phase difference results from the rotation directions of the first 7 and the second 8 alternating voltage excitation signal being in the opposite directions to each other. Since in this case the phase shift between the first alternating voltage excitation signal 7 and the first alternating current response signal 16 is in the opposite direction than the phase difference between the second alternating voltage excitation signal 8 and the second alternating current response signal 17, the phase difference between the first 16 and the second 17 alternating current response signal can be compensated.

The position of the rotor of the electric machine is determined from the first and the second alternating current response signal as follows: the first and the second alternating current response signal are measured, and on the basis of the measured signals the amplitudes of the alternating current response signals are determined as a function Î(θ) of the electrical angle reference. The determined amplitudes of the alternating current response signals are recorded, in which case the graphs 16,17 of the amplitudes of the alternating current response signals are formed as a function of the electrical angle reference according to FIG. 5. The value of the electrical angle corresponding to the greatest value of the amplitude is determined from the graphs of the amplitude of the first 16 and the second 17 alternating current response signal. This occurs such that the value of the amplitude of the greatest measured alternating current response signal is identified, and a curve fit 27, e.g. a parabolic fit, for instance with the least squares method, is formed by means of the measuring points of the environment of the greatest value. After this the value 25 of the electrical angle corresponding to the maximum value of the parabolic fit 27 is resolved. The value 25,26 of the electrical angle is resolved separately for the first 16 and the second 17 graph of the amplitude of the alternating current response signal, and the value 28 of the electrical angle comprising the position information of the rotor is determined as an average value of the value 25 of the electrical angle corresponding to the maximum value of the graph 16 of the amplitude of the first alternating current response signal and the value 26 of the electrical angle corresponding to the maximum value of the graph 17 of the amplitude of the second alternating current response signal, in which case the phase differences between the alternating voltage excitation signals 7,8 and the alternating current response signals are compensated. In this case the determined value 28 of the electrical angle comprising the position information of the rotor corresponds to the point in the rotor, as presented in FIG. 6, in which the direction of the magnetization 30 produced by the stator current is convergent with respect to the flux of the rotor magnet 29.

FIG. 7 presents a determination of the position of the rotor according to prior art. In this case the load bridge 2 is fitted to supply a pulse-like electrical excitation signal 19 with the determined values of the electrical angle θ of the electric machine, and the frequency converter is fitted to determine a plurality of pulse-like electrical response signals corresponding to the aforementioned pulse-like electrical excitation signals. The frequency converter is further fitted to determine a reference point 28 for the position of the rotor of the electric machine on the basis of the aforementioned pulse-like electrical response signals.

In one embodiment of the invention a load bridge 2 is fitted to supply a second alternating electricity excitation signal 8 to the aforementioned electric machine, and the second alternating electricity excitation signal is formed in relation to the electrical angle θ 18 of the electric machine. In this case the phase shift 20 of the second alternating electricity response signal 10, 17 corresponding to the second alternating electricity excitation signal 8 is determined on the basis of the reference point 28 of the position of the rotor of the electric machine and the second alternating electricity response signal 17 The aforementioned phase shift 20 of the second alternating electricity response signal 10, 17 corresponding to the second alternating electricity excitation signal 8 is presented in FIG. 5.

The invention is described above by the aid of a few examples of its embodiment. It is obvious to the person skilled in the art that the invention is not limited to the embodiments described above, but that many other applications are possible within the scope of the inventive concept defined by the claims presented below.

It is obvious to the person skilled in the art that the first and the second electrical excitation signal, such as the first and the second alternating electricity excitation signal, can be combined into the same excitation signal, e.g. by combining the electrical first and second excitation signal consecutively. In this case the first and the second electrical response signal can also be determined as a combined electrical response signal in response to the combined excitation signal.

It is further obvious to the person skilled in the art that the method according to the invention for determining the position of the rotor of an electric machine can be performed using different measuring apparatus solutions, and that in this case some other electricity supply solution than a frequency converter can also be used for supplying the excitation signal to the electric machine.

The invention claimed is:

1. A frequency converter, comprising:
   a load bridge; a control for the load bridge, for supplying electricity between the load bridge and an electric machine connected to the load bridge;
   a determination for at least one electrical parameter of the electric machine; and
   a determination for the position of the rotor of the electric machine, wherein a load bridge is fitted to supply a first alternating electricity excitation signal to the electric machine, which first alternating electricity excitation signal is formed in relation to the electrical angle of the electric machine, and the frequency converter is fitted to determine a first alternating electricity response signal corresponding to the first alternating electricity excitation signal, and the position of the rotor is determined on the basis of the first alternating electricity response signal and determined in an operating status in which movement of the rotor is prevented,
   wherein the load bridge is fitted to supply a pulse-like electrical excitation signal with the determined values of the electrical angle of the electric machine to the electrical machine, and the frequency converter is fitted to determine a plurality of pulse-like electrical response signals corresponding to the pulse-like electrical excitation signals; and the frequency converter is further fitted to determine a reference point for the position of the rotor of the electric machine on the basis of the pulse-like electrical response signals; and the load bridge is fitted to supply a second alternating electricity excitation signal to the electric machine; which second alternating electricity excitation signal is formed in relation to the electrical angle of the electric machine; and the phase shift of the second alternating electricity response signal corresponding to the second alternating electricity excitation signal is determined on the basis of the reference point of the position of the rotor of the electric machine 40 and also on the basis of the second alternating electricity response signal.

2. The frequency converter according to claim 1, wherein the alternating electricity excitation signal is made to change according to the electrical angle, and the angle of impulsion of the rotor is determined on the basis of the first alternating electricity response signal.

3. The frequency converter according to claim 2, wherein the load bridge is fitted to supply a first and a second alternating electricity excitation signal to the electric machine, which first and second alternating electricity excitation signal are formed in relation to the electrical angle of the electric machine, and which first and second alternating electricity excitation signal are fitted to be of opposite directions in their rotation direction, and the position of the rotor is determined on the basis of the first and the second alternating electricity response signals corresponding to the aforementioned first and second alternating electricity excitation signals.

4. The frequency converter according to claim 2, wherein the load bridge is fitted to supply a pulse-like electrical excitation signal with the determined values of the electrical angle of the electric machine to the electrical machine, and the frequency converter is fitted to determine a plurality of pulse-like electrical response signals corresponding to the pulse-like electrical excitation signals; and the frequency converter is further fitted to determine a reference point for the position of the rotor of the electric machine on the basis of the pulse-like electrical response signals; and the load bridge is fitted to supply a second alternating electricity excitation signal to the electric machine; which second alternating electricity excitation signal is formed in relation to the electrical angle of the electric machine; and the phase shift of the second alternating electricity response signal corresponding to the second alternating electricity excitation signal is determined on the basis of the reference point of the position of the rotor of the electric machine and also on the basis of the second alternating electricity response signal.

5. The frequency converter according to claim 2, wherein the frequency converter comprises an input for the signal expressing the operating status of the electric machine.

6. The frequency converter according to claim 1, wherein the load bridge is fitted to supply a first and a second alternating electricity excitation signal to the electric machine, which first and second alternating electricity excitation signal are formed in relation to the electrical angle of the electric machine, and which first and second alternating electricity excitation signal are fitted to be of opposite directions in their rotation direction, and the position of the rotor is determined on the basis of the first and the second alternating electricity response signals corresponding to the first and second alternating electricity excitation signals.

7. The frequency converter according to claim 6, wherein the frequency converter comprises an input for the signal expressing the operating status of the electric machine.

8. The frequency converter according to claim 1, wherein the frequency converter comprises an input for the signal expressing the operating status of the electric machine.

9. The frequency converter according to claim 1, wherein the frequency converter comprises an input for the signal expressing the operating status of the electric machine.

10. An electrical drive, comprising:
    an electric machine; and
    a frequency converter connected to the electric machine, which electric machine comprises a machinery brake for preventing movement of the rotor, and which electrical drive comprises a control of the machinery brake, said frequency converter comprising:
    a load bridge; and
    a control for the load bridge for supplying electricity between the load bridge and the electric machine connected to the load bridge;
    a determination for at least one electrical parameter of the electric machine; and
    a determination for the position of the rotor of the electric machine,
    wherein the machinery brake of the electric machine is during the determination of the position of the rotor controlled to prevent movement of the rotor, and the load bridge is fitted to supply a first alternating electricity excitation signal to the electric machine, which first alternating electricity excitation signal is formed in relation to the electrical angle of the electric machine, and the frequency converter is fitted to determine the first alternating electricity response signal corresponding to the first alternating electricity excitation signal, and the position of the rotor is determined on the basis of the first alternating electricity response signal.

11. The electrical drive according to claim 10, wherein the alternating electricity excitation signal is made to change according to the electrical angle; and
    the angle of impulsion of the rotor is determined on the basis of the first alternating electricity response signal.

12. A method for determining the position of the rotor of an electric machine, comprising the steps of:

forming a first alternating electricity excitation signal in relation to the electrical angle of the electric machine;

supplying the first alternating electricity excitation signal to the electric machine;

determining a first alternating electricity response signal corresponding to the first alternating electricity excitation signal; and determining the position of the rotor on the basis of the first alternating electricity response signal; and preventing movement of the rotor of the electric machine during the determination of the position of the rotor;

forming a first alternating electricity excitation signal in relation to the electrical angle of the electric machine;

forming a second alternating electricity excitation signal in relation to the electrical angle of the electric machine;

fitting the first and the second alternating electricity excitation signal to be of opposite directions in their direction of rotation;

supplying the first and a second alternating electricity excitation signal to the electric machine;

determining a first alternating electricity response signal corresponding to the first alternating electricity excitation signal;

determining a second alternating electricity response signal corresponding to the second alternating electricity excitation signal; and determining the position of the rotor on the basis of the first alternating electricity response signal and the second alternating electricity response signal.

13. The method according to claim 12, further comprising the steps of:

changing the alternating electricity excitation signal according to the electrical angle; and determining the angle of impulsion of the rotor on the basis of the first alternating electricity response signal.

14. The method according to claim 13, further comprising the steps of:

forming a first alternating electricity excitation signal in relation to the electrical angle of the electric machine;

forming a second alternating electricity excitation signal in relation to the electrical angle of the electric machine;

fitting the first and the second alternating electricity excitation signal to be of opposite directions in their direction of rotation;

supplying the first and a second alternating electricity excitation signal to the electric machine;

determining a first alternating electricity response signal corresponding to the first alternating electricity excitation signal;

determining a second alternating electricity response signal corresponding to the second alternating electricity excitation signal; and determining the position of the rotor on the basis of the first alternating electricity response signal and the second alternating electricity response signal.

15. The method according to claim 13, further comprising the steps of:

forming a pulse-like electrical excitation signal with the values of the electrical angle of the electric machine;

supplying the pulse-like electrical excitation signal to the electric machine; determining a plurality of electrical response signals corresponding to the pulse-like electrical excitation signals;

determining a reference point for the position of the rotor of the electric machine on the basis of the pulse-like electrical response signals;

forming a second alternating electricity excitation signal in relation to the electrical angle of the electric machine;

supplying the second alternating electricity excitation signal to the electric machine;

determining the phase shift of the second alternating electricity response signal corresponding to the second alternating electricity excitation signal on the basis of the reference point of the position of the rotor of the electric machine and the second alternating electricity response signal.

16. The method according to claim 12, further comprising the steps of:

forming a pulse-like electrical excitation signal with the values of the electrical angle of the electric machine;

supplying the pulse-like electrical excitation signal to the electric machine;

determining a plurality of electrical response signals corresponding to the pulse-like electrical excitation signals;

determining a reference point for the position of the rotor of the electric machine on the basis of the pulse-like electrical response signals;

forming a second alternating electricity excitation signal in relation to the electrical angle of the electric machine;

supplying the second alternating electricity excitation signal to the electric machine;

determining the phase shift of the second alternating electricity response signal corresponding to the second alternating electricity excitation signal on the basis of the reference point of the position of the rotor of the electric machine and the second alternating electricity response signal.

* * * * *